United States Patent [19]

Caswell et al.

[11] Patent Number: 4,642,459

[45] Date of Patent: Feb. 10, 1987

[54] LIGHT PEN INPUT SYSTEM HAVING TWO-THRESHOLD LIGHT SENSING

[75] Inventors: Nathan S. Caswell, Yorktown Heights; Ifay F. Chang, Chappaqua, both of N.Y.

[73] Assignee: International Business Machines Corporation, Armonk, N.Y.

[21] Appl. No.: 735,430

[22] Filed: May 17, 1985

[51] Int. Cl.[4] .................................. G02B 6/00
[52] U.S. Cl. .................... 250/227; 235/472; 340/707
[58] Field of Search ......... 250/227, 566, 568; 235/472, 473; 340/707, 708; 365 P; 350/96.1, 96.24

[56] References Cited

U.S. PATENT DOCUMENTS 3,777,153 12/1973 Anderson et al. .................. 250/227
4,109,146 8/1978 Hillman .............................. 235/472

Primary Examiner—Edward P. Westin
Attorney, Agent, or Firm—Ronald L. Drumheller; Alexander Tognino

[57] ABSTRACT

A fiber optic light pen has been adapted for high resolution use with an interactive display of a computer system. The body of the light pen, which is adapted to be hand held, includes a slightly movable tip for engaging a display screen. When so engaged, a screen sensor within the body signals to the computer system that the pen is in contact with the screen. A principal fiber optic element or conduit within the pen body collects light emitted by the screen without the use of any imaging optics and a two-threshold light detector responding to two different amplitude levels of collected light permits separate and high resolution determination of the vertical and horizontal positions of the light pen with respect to the screen.

27 Claims, 11 Drawing Figures

LIGHT PEN INPUT SYSTEM HAVING TWO-THRESHOLD LIGHT SENSING

TECHNICAL FIELD

This invention generally relates to light pen computer input apparatus for use with an interactive display of a computer system, and more particularly, it pertains to a two-threshold light sensing scheme for locating the light pen position with high accuracy, especially when the light pen is a fiber optic light pen. It also relates to an independent scheme for sensing screen engagement by the pen.

BACKGROUND INFORMATION

Light pen input systems provide increased ease and convenience of use for computer operators. Input systems of this type require little or no training and enable the operator to quickly and easily interact with the computer. Instead of laboriously typing commands and data into the machine with a conventional keyboard, the operator can simply point to prompts supplied by the display, or write the data to be entered directly on the screen. Unfortunately, typical light pen systems are expensive, provide limited resolution and feel awkward to use.

Conventional light pens have a lens system in the tip of the pen to image a small region of the display screen upon a light sensor in the pen. When the raster scanning electron beam of the display reaches the small region of the display imaged by the lens system, light emitted by the screen phosphor in that small region is detected by the light sensor in the pen. The pen immediately signals the computer system that light has been sensed. Since the position of the light pen at that time coincides with the position of the raster scanning electron beam, the computer can easily determined where the pen is located (i.e. at the location of the scanning electron beam when the light detection signal is received by the computer). Unfortunately, the lens system not only adds to the pen's cost, it also makes the pen bulky so that it has an unnatural and awkward feel.

Light pen designs have been proposed which avoid some of these difficulties, but have other drawbacks instead. In particular, light pens have been proposed which include fiber optic elements so that the need for a lens system can be avoided. U.S. Pat. No. 3,498,692 issued to Jewitt et al, for example, describes a light pen design, which features use of a fiber optic element for collecting light from a cathode ray tube display. The light collected when the pen is placed on the screen is correlated with information relating to the electron beam sweep that produced the display so that the pen location can be identified.

However, while fiber optic pens are lower in cost, more reliable, and provide a better feel, they suffer from poor resolution. Due to the wide angle of acceptance of the fiber optic element, light is collected from a large number of screen picture elements (pels), which reduces the system's ability to accurately correlate the collected light with the display sweep. This in turn reduces the system's ability to identify the pen's position coordinates; that is, location on the screen and accordingly, the pen's resolution.

Because determination of light pen position depends upon collected light, it is important that only relevant light be considered; that is, light collected when the pen is placed on the display screen. Thus, it is desirable for a light pen to include means for determining when the pen has engaged the screen.

Conventional light pen systems rely upon the collected light used for screen coordinate position determination to also provide an indication of screen engagement. This is not very suitable for some applications, such as for hand writing input. For such applications, it is desirable to have a light pen system which can sense screen engagement even in a dark portion of the screen, independently of any particular image on the display.

SUMMARY OF THE INVENTION

It is therefore an object of this invention to provide a light pen of reduced cost, increased reliability and improved feel.

It is another object of this invention to provide a fiber optic light pen system having high resolution position determination without requiring a bulky optical imaging system in the pen tip.

It is also an object of this invention to provide a light pen position sensing scheme which improves the accuracy to which the position of a light pen can be resolved.

Still another object is to provide a light pen position sensing scheme not limited in resolution by the size of the field of view of the light pen.

Another object is to provide a passive light pen having no active components.

It is still a further object of this invention to provide a fiber optic light pen having independent means for sensing pen engagement with a display screen.

It is also an object of this invention to provide a light pen screen engagement sensing switch which has a very short throw distance so as to simulate the feel of an ordinary writing pen.

These and further objects have been achieved by the present invention in which a light pen collects light from a display screen through a principal optical fiber without the use of any imaging optics and senses touch of the light pen to a display screen using at least one additional optical fiber.

No bulky imaging optics are needed in the pen tip because a novel two-threshold light sensing scheme is used to accurately determine the position of the light pen from the light collected by the principal fiber to an accuracy which is not limited by the size of the field of view of the light collecting fiber.

The two-threshold sensing scheme works to resolve the position of a fiber optic light pen (or any other kind of light pen) to virtually one pel (picture element) resolution by determining the horizontal position of the pen (along the scan lines) using at least one horizontal position measuring event and by separately determining the vertical position of the pen (perpendicular to the scan lines) using at least one different vertical position measuring event. A "first" threshold (for the amplitude of the light sensed by the pen) is used to determine the horizontal position of the pen while a "second" threshold (for the amplitude of the light sensed by the pen) is used to determine the vertical position of the pen. The scan line which corresponds in position to the position of the light pen (with possibly a substantially constant offset) is chosen through use of the second threshold, while the position of the light pen along the chosen scan line (with possibly a substantially constant offset) is separately determined through use of the first threshold.

It has been found that with the two-threshold light sensing scheme of this invention, virtually one pel resolution can be achieved even though the field of view of the pen may be hundreds or even thousands of pels, because the vertical and horizontal positions of the pen are separately and independently determined, thereby allowing each of the two separate position detection functions to be individually designed for optimum accuracy and sensitivity. Heretofore, a single (though sometimes elaborately chosen) detection event has been used to determine the position of a light pen in both the vertical and horizontal directions simultaneously (i.e. a specific instant in time was somehow chosen to correspond with the position of the pen and the coordinates of the raster scan at that specific instant then determined the sensed position of the pen).

With the two-threshold sensing system of this invention, at least two separate instants in time are detected. One of the detected time instants is used to determine only the scan line corresponding with the pen position. Inherently, a horizontal position along that chosen scan line also corresponds with that particular time instant, but this horizontal position information is deliberately not used to determine the horizontal position of the pen, because the raster scan position of that time instant has been selected for optimum accuracy in the vertical direction at the expense of accuracy in the horizontal direction. A separately detected time instant is used to determine the position of the light pen along this chosen scan line, a time instant which has been selected for optimum raster scan position accuracy in the horizontal direction.

Depending upon the embodiment, the corresponding scan line may be determined either before, during, or after the pen position along the scan line is determined. Furthermore, since the horizontal position determining threshold event(s) occur at a different time than the vertical position determining threshold event(s) and since they occur in a known sequence, it is possible to select the two threshold amplitudes totally independently of each other. In theory, either threshold could be greater than the other and with appropriate time gating the thresholds conceivably might even be equal to each other. However, the embodiments which result from some of these variations are inconvenient to implement in practice and have no apparent compensating advantages. Accordingly, it is preferred that the first threshold amplitude (the horizontal position determining threshold) be lower than the second threshold amplitude (the vertical position determining threshold).

Figure 7:
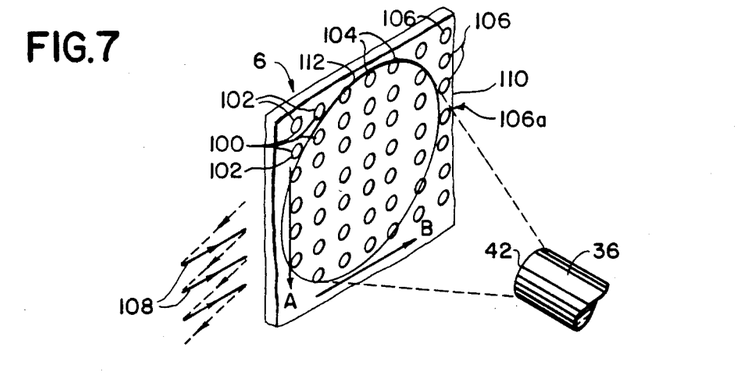
FIG. 7 is a fragmented isometric view of the light pen principal fiber optic element in relation to a display screen in accordance with this invention.
Figure 7A:
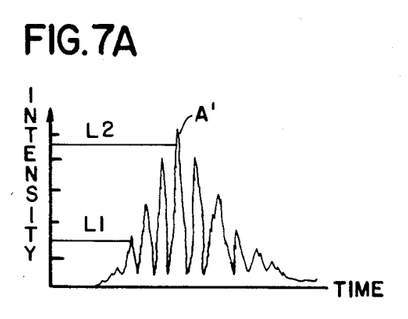
FIG. 7A is a graphic representation of the light intensity that would be produced in time within the field of view of the light pen's principal fiber optic element in accordance with this invention.
Figure 7B:
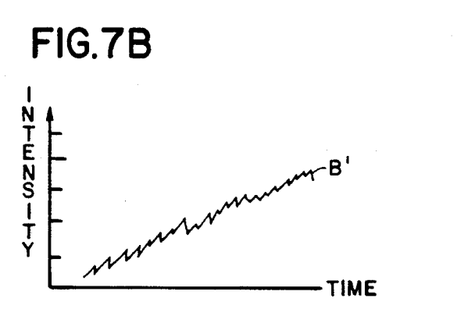
FIG. 7B is a graphic representation of the instantaneous light intensity that would be produced in time across the diameter of the field of view of the light pen's principal fiber optic element in accordance with this invention.

In order to avoid flicker, the visible light emitting phosphors used in CRT display screens all have a substantial persistence (i.e. the light emitted from the phosphors only gradually declines after the electron beam excitation is removed). As a result, when a light pen has a field of view covering many pels (such as is shown in FIG. 7), and the CRT electron beam sweeps horizontally across the field of view, the light sensed by the light pen gradually increases as more and more of the pels being viewed are turned on by the electron beam horizontally sweeping across the field (FIG. 7B illustrates a typical sensed light signal during a line sweep across a field of view covering many pels). As successive horizontal sweeps get closer to the center of the field of view, the maximum light sensed during a horizontal sweep across the field of view becomes higher. This results not only from the larger number of pels contributing to the sensed light (i.e., the length of the scan line portion within the field of view generally increases as the scan line gets closer to the center of the field of view) but also from the generally better light collection efficiency at the center of the field of view. After the electron beam has scanned horizontally across the field of view, the light emitted by the phosphor in the field of view declines gradually until the next line sweep enters the field of view. Typical CRT phosphors are still emitting some light when the next line is scanned, so that the sensed light level typically does not completely drop to zero until after the whole field of view has been scanned (FIG. 7A illustrates a typical sensed light signal during a full scan of a field of view covering many pels).

The second threshold is preferably selected such that the sensed light amplitude reaches that threshold just before the CRT beam leaves the field of view during the horizontal scan of a scan line which passes close to the center of the field of view of the light pen. It is most preferred that this second threshold be selected such that it is reached only when the CRT beam traverses the scan line which passes most closely to the center of the field of view of the pen (such a threshold L2 is illustrated in FIG. 7A). If the second threshold is so selected, the scan line sensed by the second threshold directly corresponds to the vertical position of the pen.

A lower second threshold also could be used and it too would be exceeded during the most central line scan in the field of view, but it would also be exceeded during one or more additional line scans. It should be apparent that the associated computer could still determine the central scan line from a group of threshold sensed scan lines (i.e. the central scan line in the field of view of the pen is the scan line in the center of the group of scan lines sensed). Alternatively, the vertical position for the pen could be calculated as the average of the vertical positions of the group of threshold sensed scan lines.

It is also possible to use (or sense) only the first scan line of two or more scan lines meeting the second threshold criterion. This obviously results in a vertical offset of the threshold sensed scan line with respect to the actual scan line which passes most closely to the center of the field of view of the light pen. However, in many applications this offset would cause no serious problem because it remains substantially constant (i.e. does not change over a user's session). This offset also could be corrected for by the computer without resorting to an interpolation involving many sensed scan lines by applying a predetermined vertical offset correction (which could be calibrated or adjusted from time to time by the user or the computer).

Selection of a second threshold high enough that it senses only the scan line closest to the center of the field of view does have a disadvantage in that changes due to aging and many other factors causes a variation over time in what this second threshold amplitude should be. In order to prevent this second threshold over time from becoming too high to sense any scan line, on the one hand, or so low that multiple scan lines are sensed, on the other hand, typically will require some kind of user or computer adjustment to the second threshold from time to time. If it is critical that only one scan line be sensed by the second threshold, then in a practical embodiment, some kind of automatic control of the second threshold probably will be needed. It should be emphasized that automatic adjustment of the second threshold by the computer can be implemented quite easily by those of ordinary skill in this field, since the computer readily can determine when more than one successive scan line meets the second threshold criterion (so that the second threshold then can be incrementally raised by a small amount before the next full scan of the pen's field of view) or when no scan line has been sensed (so that the second threshold then can be incrementally lowered by a small amount before the next full scan of the pen's field of view). A computer can readily determine that the second threshold is too high when one or more valid first threshold detections are made during a screen scan without any second threshold detection.

The first threshold is preferably selected such that there will be as little inaccuracy as possible in the horizontal position determination of the light pen. This will occur, for example, if the first threshold is selected such that when the light amplitude reaches this threshold during a horizontal scan across the field of view, the light amplitude is changing at a maximum rate (or nearly so). Variation in the time position at which the first threshold is exceeded due to noise and other unpredictable factors is minimized by making the first threshold correspond with a region of maximum slope in the light signal. It is necessary, in addition, to choose a first threshold which is not lower than the highest minimum light signal level between successive line scans (i.e., the detected light signal must fall below the first threshold between each successive line scan through the field of view) and it must obviously be low enough to be reached during the line scan or scans when horizontal position determination information is to be collected. A suitable first threshold L1 is illustrated, for example, in FIG. 7A.

In general, there is no particularly convenient way of directly detecting the center of a horizontal scan through the field of view. The first threshold is detected at a horizontal position typically offset from the center of the field of view, unless of course the value of the first threshold is deliberately adjusted by the user or the computer such that it falls midway along the particular rising slope in the light detector signal which corresponds to the scan line(s) being used for position determination. As described before in relation to the vertical position determination, an offset is not a serious problem in most applications because it does not significantly change during a user's session. As with the vertical position determination, a horizontal offset could be compensated for without resorting to an interpolation by applying a predetermined horizontal offset correction (which could be calibrated or adjusted from time to time by the user or the computer).

Just as more than one event could be sensed for the vertical position determination, so also more than one event could be sensed to determine the horizontal position. As with the vertical position determination, interpolation also could be used to determine the horizontal position of the light pen from two or more first threshold detections. For example, an average of two or more first threshold detections could be used to make a horizontal position determination. The interpolation could involve first threshold detections in separate scan lines or in the same scan line (the fall of the light signal through the first threshold can be a detected threshold event also).

Since the horizontal position determination and the vertical position determination are separate and independent functions, it should be clear furthermore, that the scan line chosen through use of the second threshold may or may not be involved in the horizontal position determination, depending upon the embodiment. It might be convenient, for example, to first sense a scan line using the second threshold and then determine the horizontal position of the light pen during the next scan line through the field of view. It is even possible to determine the vertical and/or horizontal position of the light pen through use of more than one screen scan. The two positions could be determined in separate screen scans or one or both of the position determinations could individually require more than one screen scan (for example as with a successive approximation method of position determination).

In the preferred embodiment, a first threshold sensing event occurs during many if not all of the scan lines which traverse the field of view. However, only one of these first threshold sensing events will be used to determine the horizontal position of the light pen. The one which will be used is determined by the second threshold, which is set at a level so as to sense the scan line closest to the center of the field of view of the pen. The first threshold sensing event associated with the scan line selected by the second threshold is used to determine the horizontal position. Since the first threshold sensing event in a scan line occurs before it is known whether that scan line will meet the second threshold criterion, the time position of the first threshold sensing event is temporarily stored through use of a time delay until a determination is made as to whether or not the second threshold criterion is satisfied. The time delay is sufficiently long that the second threshold will be exceeded during that time period if that scan line is the most central scan line. The pen is considered to have the same vertical coordinate as the scan line sensed by the second threshold and the same horizontal position as the time delayed first threshold sensing event (preferably offset corrected as described earlier).

The light pen in accordance with this invention also features a screen sensor for determining when the light pen has engaged the display screen. The screen sensor apparatus is separate from the principal light conduit and the two-threshold light sensing apparatus associated with the principal light conduit and can, therefore, independently provide information regarding screen engagement.

In preferred form, the light pen of this invention includes a slender body which is adapted to be hand held; as for example, the cylindrical shape of a conventional pen or pencil. Additionally, the preferred pen includes a tip, movably mounted in the body, extending from one end, which acts as a stylus for engaging the display screen. The preferred pen also includes a principal fiber optic conduit mounted in the body and the tip; as for example coaxially, for collecting light from a plurality of display pels when the tip has engaged the screen.

The preferred pen also includes an independent screen sensor, in communication with the computer system for determining if the pen tip has engaged the display screen, and for supplying a signal to the computer system when it has. In preferred form, the screen sensor itself includes a light source, a sensor detector and a fiber optic conduit which permits the light source to communicate with the sensor detector. This conduit features at least a first and a second separate segment and a means for optically coupling the segments. The preferred pen further includes a second detector, this detector being in communication with the principal fiber optic conduit and the computer system. This second detector features a transducer in communication with the principal fiber optic conduit for producing a signal representative of the light intensity received from the principal conduit.

The preferred second detector also includes a first threshold or level comparator connected to the transducer output for producing a signal when the transducer signal exceeds a predetermined first amplitude corresponding to a first light level. This detector further includes a second threshold or level comparator also connected to the transducer output for producing a signal when the transducer signal exceeds a predetermined second amplitude corresponding to a second light level. Finally, the detector includes a driver electrically connected to the output of the first and second threshold comparators. The driver, which can be housed in the computer terminal, is arranged to produce a signal in response to comparator indications that both the first and the second level of light amplitude has been sensed within a fixed time period.

The foregoing, and other objects, features, and advantages of the invention will become apparent from the following more detailed description of a preferred embodiment of this invention as illustrated in the accompanying figures.

DETAILED DESCRIPTION OF PREFERRED EMBODIMENTS OF THE INVENTION

As noted, light pens provide ease and convenience of computer use. With an interactive display, an operator can conveniently enter commands and data without need for resorting to a burdensome keyboard.

Figure 1:
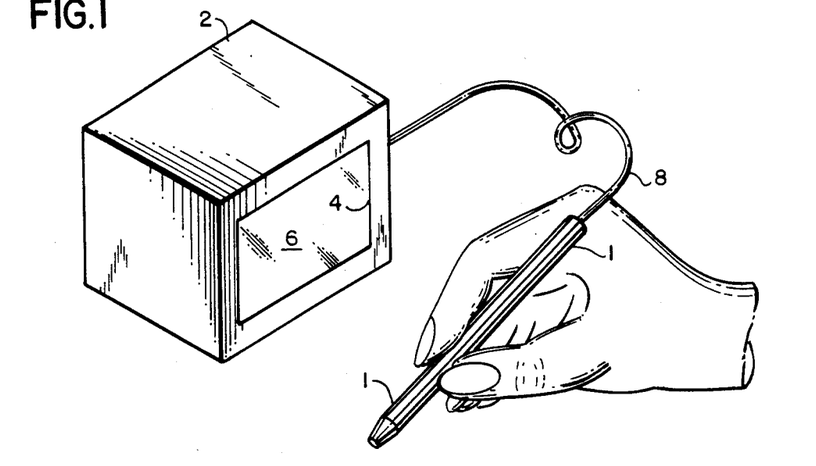
FIG. 1 is an isometric view of the light pen and a companion display in accordance with this invention.

A basic interactive computer display featuring a light pen is depicted in FIG. 1. As shown, the system includes a light pen 1, a computer system 2, a display 4 and a screen 6. Pen 1 is connected to computer system 2 by means of cabling 8. A light pen in accordance with this invention is shown in several embodiments in FIGS. 2 and 6. The several embodiments are generally similar and vary primarily in the form of the screen sensor that each includes. Among the several embodiments, like elements are referred to with like numerals.

Figure 2:
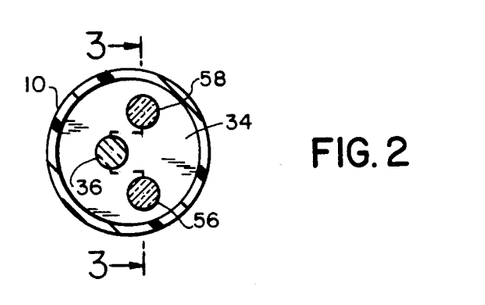
FIG. 2 is a section view of a first and second form of the light pen in accordance with this invention taken in a plane perpendicular to the pen's length axis at a point approximately midway along the pen's length.
Figure 3:
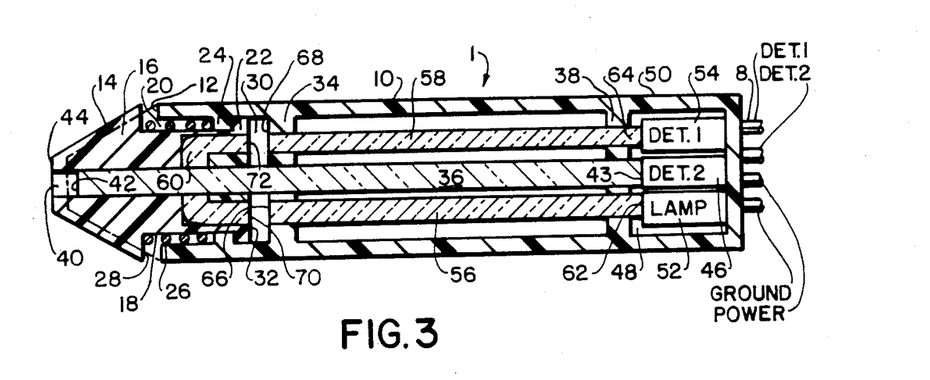
FIG. 3 is a section view of a first form of the light pen in accordance with this invention along line 3—3 of FIG. 2.

A first form of pen 1 is shown in FIGS. 2 and 3. With reference to these figures, pen 1 is seen to include a generally cylindrical body 10 suitable to be hand held, and having the general shape of a slender pen or pencil. Pen body 10 has a first end 12 in which a pen tip 14 is provided. Tip 14 is coaxially and movably mounted in body end 12. Tip 14 has a generally conical forward section 16 that extends beyond body end 12, and is suitable for engaging screen 6 of display 4 shown in FIG. 1. Tip 14 also has a rearward cylindrical section 18 that is received in a generally cylindrical bore 20 provided at body end 12. Tip rearward section 18 has an annular shoulder 22 which cooperates with an annular stop 24 in cylindrical bore 20 to prevent tip from passing out of bore 20. A restoring spring 26 is provided between stop 24 and the rear face 28 of tip forward section 16. Spring 26 urges tip shoulder 22 against stop 24 to form a cavity 30 between tip rear face 32 and an internal bulkhead 34 of body 10.

Accordingly, when tip 40 is placed in engagement with screen 6, tip 14 is moved inwardly of bore 20, until tip face 32 abuts bulkhead 34. On removal of pen 1 from screen 6, spring 26 restores cavity 30 and urges tip shoulder 22 against stop 24.

Continuing with reference to FIG. 3, pen 1 is seen to include a principal fiber element or conduit 36 that is axially mounted in body 10. Conduit 36 is received in fixed relation in body bulkhead 34 and 38. Conduit 36 is also movably received in bore 40 of tip 14 so that when tip 14 engages display 6, conduit end 42 is coextensive with end 44 of tip 14, and engages screen 6.

Conduit 36 as shown is optically coupled at conduit end 43 to a detector 46 located in a compartment 48 at end 50 of body 10. The features of detector 46 will be more fully described hereafter. As will be apparent to those skilled in the art, detector 46 could also be located in computer 2, with appropriate optical coupling made by way of cabling 8. In operation, light received at conduit end 42 passes down conduit 36 where it is evaluated to determine the pen coordinates.

The preferred light pen of this invention also includes a screen sensor that provides an indication to the computer system 2 when pen 1 has been placed in engagement with display screen 6. The screen sensor features an optical circuit that is independent of the principal conduit 36 so that determination of screen engagement can be made independently of pen coordination determination.

The screen sensor shown in FIG. 3 includes a light source 52, a screen sensor detector 54 and an optical conduit that facilitates communication between light source 52 and detector 54. Light source 52 and detector 54 are of any suitable type as is known in the art. As shown, the sensor conduit includes a first separate segment 56, which in preferred form may be a fiber optic element, and a second separate segment 58, also a fiber optic element in preferred form. The two segments are optically coupled by suitable means; as for example, and as shown in FIG. 3, another fiber optic element 60, arranged in tip 14 and moveable therewith. As shown in FIG. 2, fiber optic elements 36, 56 and 58 are adequately spaced to provide convenient mounting.

In accordance with the screen sensor design shown in FIG. 3, fiber optic element 56 has a first end 62 in optical communication with light source 52. Further, element 58 has a first end 64 in optical communication with detector 54. Opposite ends 66 and 68, respectively, of elements 56 and 58, are arranged in proximity to each other at body bulkhead 34. To facilitate optical coupling of ends 56 and 58, first end 70 and second end 72 of optical coupler 60 are arranged in axial alignment with companion ends 56 and 58.

With this arrangement, when tip 14 is brought into engagement with screen 6, end 70 and 72 are aligned with, and brought adjacent to element ends 66 and 68, to facilitate completion of the optical circuit which joins light source 52 and detector 54. The optical path is, of course, interrupted when the pen is removed from screen 6. Signals corresponding to screen engagement are forwarded to the computer system for evaluation along with the pen position information.

Figure 5:
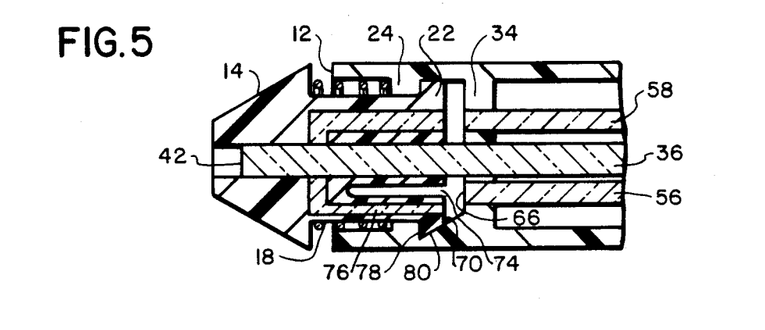
FIG. 5 is a section view of a second form of the light pen in accordance with this invention taken along lines 3—3 of FIG. 2.

A similar arrangement to that of FIG. 3 is shown in FIG. 5. The difference between the embodiment of FIG. 5 and FIG. 3 is that in the embodiment shown in FIG. 5, in addition to coupling means 60, tip cylindrical section 18 is provided with a notch 74 that defines a radially flexible member 76 in which end 70 of coupling means is located. In this arrangement, coupling means end 70 is misaligned with companion end 66 of element 56 to enhance the certainty of optical interruption. Member 76 further includes a cam surface 78 which cooperates with a companion surface 80 provided in body 10. As a result, when tip 14 is advanced into bore 20, member 76 is radially deflected inwardly of the center line of tip 14 and end 70 is aligned with end 66 of element 56 to complete the light path coupling light source 52 and detector 54.

Figure 4:
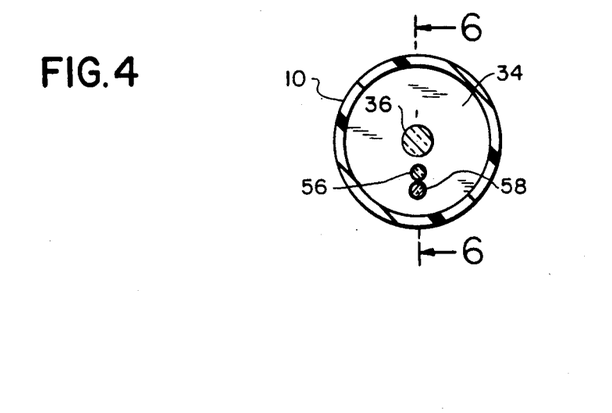
FIG. 4 is a section view of a third form of the light pen in accordance with this invention taken in a plane perpendicular to the pen's length axis, at a point approximately midway along the pen's length.
Figure 6:
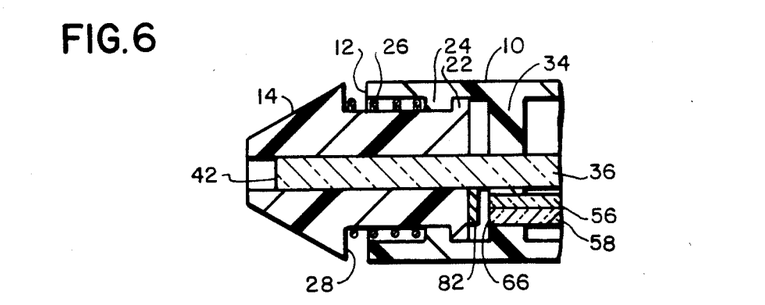
FIG. 6 is a section view of a third form of the light pen in accordance with this invention taken along line 6—6 of FIG. 4.

A still further, and most preferred, arrangement for coupling fiber element 56 and 55 is shown in FIGS. 4 and 6. Here, a mirror or other reflective surface 82 is provided on surface 32 of tip rearward section 18. Mirror 82 cooperates with closely disposed elements 56 and 58, best seen in FIG. 4. In this arrangement, however, the light path is made when the mirror is spaced approximately a fiber diameter from element ends 66 and 68. Coupling is interrupted when tip 14 is advanced toward bulkhead 32 as when pen 1 engages screen 6. A simple inversion of the detector output is all that is required to make operation compatible with the sensor forms shown in FIGS. 3 and 5 as would be appreciated by those skilled in the art. It should be noted that the very slight spacing involved gives this embodiment the feel of a conventional ball point pen.

As noted previously, in order for the pen to interact with the display, it is essential the computer system know where on the screen the pen is located; that is, the screen position coordinates. As is well known in the art, coordinates location is conveniently accomplished with reference to the coordinates of the activating sweep that produces the display.

For example, in the case of a cathode ray tube display, (CRT), which for simplicity will be assumed monochromatic, the CRT is provided with a screen including a matrix of picture elements (pels) in the form of vertical columns and horizontal rows of phosphor dots. These pels are caused to radiate light when excited by the electron beam of the CRT. The electron beam is horizontally swept over each row of pels successively beginning at the top of the screen. As the beam is swept horizontally and then vertically the computer system modulates the beam with picture information which is subsequently presented at the screen in patterns of light and dark.

Because the computer system knows where the electron beam is at any time, the sweep start time and sweep rate being known, the system can identify the coordinates of points on the screen by reference to the beam. Reference to the beam can be simply made by noting when the beam excites a pel. Therefore, by providing the light pen with a photo sensitive device and correlating the output of the photosensitive device with the electron beam sweep, the computer can identify the pen location with reference to the beam coordinates.

As described, in operation, the display provides the light required to locate the pen. However, if the screen picture information is likely to interfere with or be unable to satisfy the pen location process, another approach must be used; as for example, controlling screen illumination for at least one picture period to permit pen location.

This approach, however, has been found to have some drawbacks.

As known in the art, an alternative to screen control is use of a display having multiple phosphor arrays that are separately addressable. As suggested in German Offenlegungshrift DE No. 30337714, the screen may include addressable phosphors, in addition to the picture phosphors, which emit light outside the visible spectrum; for example, IR or UV. For example, this could be a shadow mask or beam index system. The light pen in such an arrangement would be made sensitive to the IR or UV wave length, thus avoiding interaction with the picture information.

A pictorial representation of the pen location process in accordance with this invention is shown in FIGS. 7, 7A, and 7B. FIG. 7 is a fragmented view of CRT display Screen 6. As shown, screen 6 includes an array of pels 100 comprising phosphor dots 102 arranged in columns 104 and rows 106. As described, picture information is displayed by selectively exciting phosphors 102 with an electron beam 108 shown schematically to the left of screen fragment 110. As noted, the location of the light pen can be determined by correlating the light collected by the pen with the known coordinates of the beam as it is swept.

In accordance with this invention, in order to reduce cost, increase reliability and improve feel, the light pen uses a principal fiber optic conduit to replace a lens system.

FIG. 7 shows the principal fiber optic conduit 36 of the light pen of this invention in position to collect light from screen fragment 110. In this position, conduit end 42 would be placed upon the screen face place not shown, and would have a field of view represented by circle 112.

As seen, field of view 112 is large, i.e., greater than 20 degrees full width at half maximum, and encompasses a number of pels 102; typically, a linear dimension of ten.

Because pels have a persistence, that is, their light continues for a time after excitation, the light collected by conduit 36 is a summation of the light generated as beam 108 sweeps horizontally over a row within field 122.

FIG. 7B is a graphic representation of this and shows that where the persistence is greater than the sweep time across field 112, the intensity of the light collected continues to increase until the sweep exits field 112. The light intensity would thereafter decay at a rate determined by the pel persistence. The sweep shown corresponds to row 106a which is centrally located relative to field 112.

FIG. 7A is a plot of the light intensity collected in successive rows within field 112 as beam 108 progresses down the screen fragment.

As would be expected, the peaks of the curve correspond to the respective rows within field 112.

The height of the peaks is proportional to the number of pels per row within field 112. Additionally, peak height is dependent on the proximity of the pels to the center of field 112. Because the light collection efficiency of conduit 36 is geometrically dependent, light generated away from the center of conduit 36 is less readily collected.

In FIG. 7A, the central peak A' corresponds to the maximum light intensity generated by a sweep of pel row 106a, and therefore corresponds to the maximum of the instantaneous light intensity B' shown in FIG. 7B.

Because field of view 112 encompasses so many pels, the resolution of a conventional fiber optic light pen is low. As noted, a light pen's resolution is determined by the ability to indicate its location, which in turn, depends upon the correlation of light collected with the display sweep. Where light is collected from many pels, as in the case of a fiber optic pen, it is ordinarily very difficult to tie the sweep to any particular pel or group of pels.

While at first glance, it may seem possible to identify central peak A' shown in FIG. 7A by means of a single level light detector, and thereby to correlate the collected light with the sweep, in practice, it is not possible to reliably trigger a detection circuit from A'. To be effective, the detector level would have to be set close to the anticipated height of the peak. But because the top of the peak is relatively flat as compared with the slope on either side, trigger jitter occurs in the detection circuit, which renders this approach undesirable.

The fiber optic light pen in accordance with this invention, however, overcomes the difficulties associated with the wide angle of view inherent in a fiber optic light collection element, and provides for repeatable pen location to within one pel of the actual.

Figure 8:
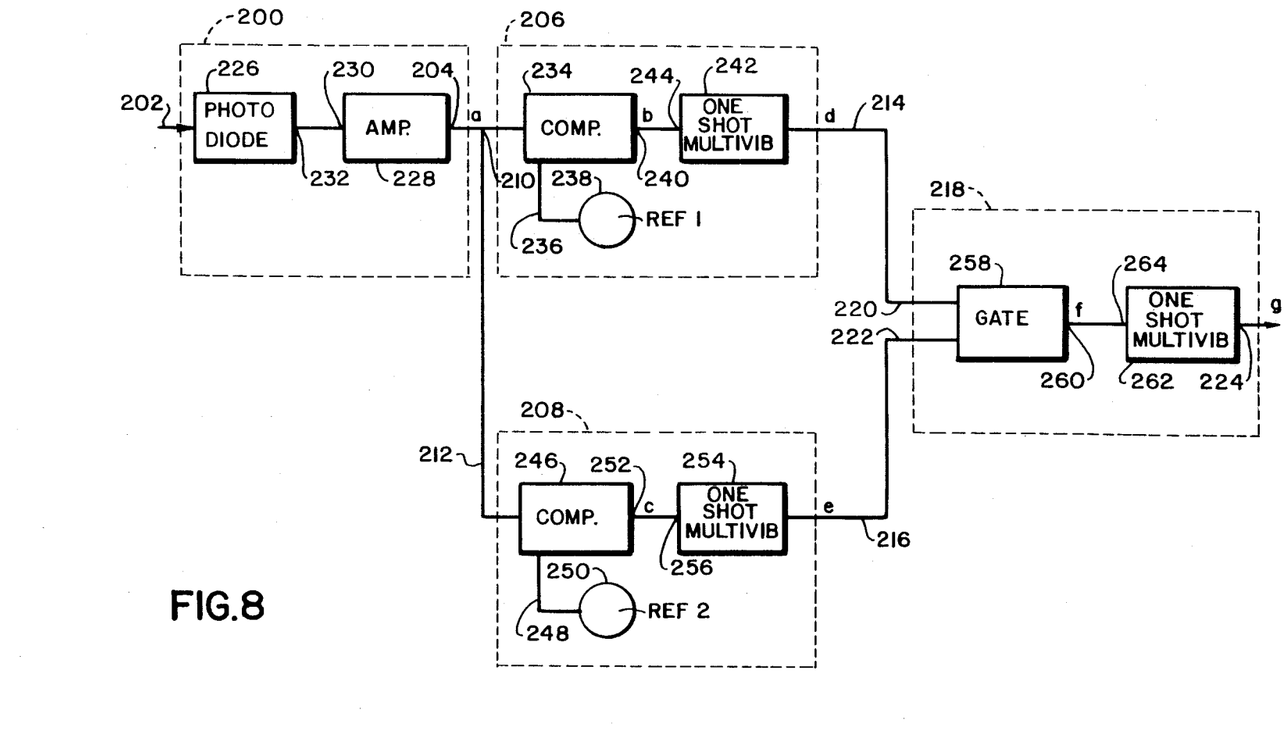
FIG. 8 is a block diagram of the preferred light pen coordinate detector in accordance with this invention.

The preferred fiber optic light pen in accordance with this invention features a two-level light detector for correlating the collected light with the display sweep. As shown in FIG. 8, the detector 46 features a transducer 200 for receiving light from conduit 36 at input 202. Transducer 200 converts the light received into an electrical signal having an amplitude proportioned to the light intensity at transducer output 204.

A first level sensor 206 and a second level sensor 208 are connected to transducer 200. The input 210 of sensor 206 and the input 212 of sensor 208 are connected in parallel circuit relation to output 204 of transducer 200.

Sensor 206 produces a signal at its output 214 on receipt of a signal from transducer 200 in excess of a first predetermined amplitude. Sensor 208, on the other hand, produces a signal at its output 216 on receipt of a signal from transducer 200 in excess of a second predetermined amplitude.

Continuing with reference to FIG. 8, detector 46 is seen to further include a driver 218. Driver 218 has a first input 220 electrically connected to output 214 of sensor 206 and a second input 222 electrically connected to output 216 of sensor 208. In operation, driver 218 produces a signal at its output 224 in response to a predetermined combination of the signals from sensors 206 and 208.

In preferred form, transducer 200 includes a conventional photodiode 226 optically coupled to pen fiber conduit 36 at input 202 for converting the light received to an electrical signal in a manner well known in the art. Additionally, transducer 200 includes a transimpedance amplifier 228 having an input 230 electrically connected to the output 232 of photodiode 226 for electrically coupling the low impedance output of diode 226 to the input of sensor 206 and 208 connected at transducer output 204, as also well known in the art.

Continuing with reference to FIG. 8 in preferred form, first level sensor 206 includes a comparator 234 having a first input at sensor input 210 connected to amplifier 228 at transducer output 204 and a second input 236 connected to a first reference signal 238. Reference signal 238 constitutes the predetermined level of sensor 206. Comparator 234 produces a signal at its output 240 when the amplitude of amplifier 228 exceeds the amplitude of reference signal 238. Sensor 206 further includes a one-shot multivibrator 242 having an input 244 connected to the output 240 of comparator 234. Multivibrator 242 is of the edge-triggered type and produces an output pulse at output 214 of sensor 206, which pulse terminates a predetermined time interval after receipt of a signal from comparator 234. This multivibrator output pulse therefore serves as a timing reference, the termination of which serves to signal the occurrence of an event during such predetermined time interval which satisfies predetermined conditions specified hereinafter.

Like sensor 206, sensor 208 also includes a comparator 246 having a first input at sensor input 212 connected to amplifier 228 at transducer output 204 and a second input 248 connected to a second reference signal 250. Reference signal 250 constitutes the predetermined level of sensor 208.

Comparator 246 produces a signal at output 252 when the signal from amplifier 228 exceeds the amplitude of second reference signal 250. Sensor 208 further includes a one-shot multivibrator of the edge-triggered type having an input 256 connected to the output 252 of comparator 246. Multivibrator 254 produces an output signal having a predetermined duration of sensor output 216 on receipt of a signal from comparator 246.

Also in preferred form, driver 218 includes a gate 258 having a first input at driver input 220 electrically connected to multivibrator 242 at sensor output 214. Additionally, gate 258 has a second input at driver input 222 electrically connected to the output of multivibrator 254 at sensor output 216. Gate 258 is of the conventional "and" type and produces a signal at output 260 only when signals from both multivibrator 242 and 254 are present.

Driver 218 further includes a one-shot multivibrator 262 of the edge-triggered type having an input 264 electrically connected to the output 260 of the gate 258. However, in accordance with the invention unlike multivibrator 242 and 254, multivibrator 262 produces an output at driver output 224 when the signal at output 208 of gate 258 turns off.

Before considering the operation of detector 46 it will be instructive to consider how the levels of reference signals 238 and 250 and the duration of the output of multivibrator 242 and 254 are selected.

In accordance with this invention satisfactory results can be obtained if a two level detector is used wherein the first level is set to the light intensity expected when the beam sweep first enters field 112 and the second level set to the maximum intensity expected if the sweep were to traverse a diameter of field 112, for example pel row 106a of FIG. 7. Further, if the test for satisfaction of the second level is made during the time following satisfaction of the first, and within a time period greater than the time necessary for the sweep to traverse a diameter of field 112, then it can be concluded that if the second condition is satisfied, the sweep has just exited field 112 after having passed under the center of conduit 36. The center of conduit 36 can then be determined by utilizing the timing reference provided by the output pulse from multivibrator 242.

Therefore, based on the above, the first reference level, signal 238 is set to correspond to a light level just above the system noise. In this way, comparator 234 will react to the excitation of a pel or part thereof first excited within field 112. The second reference level signal 250 is set to correspond to the light level expected when the sweep has traversed a diameter of field 112. Multivibrator 242 of sensor 206 is set to have a pulse width corresponding to the time required for the sweep to traverse a diameter of field 112 and multivibrator 254 of sensor 208 set to have any convenient pulse width.

Figure 9:
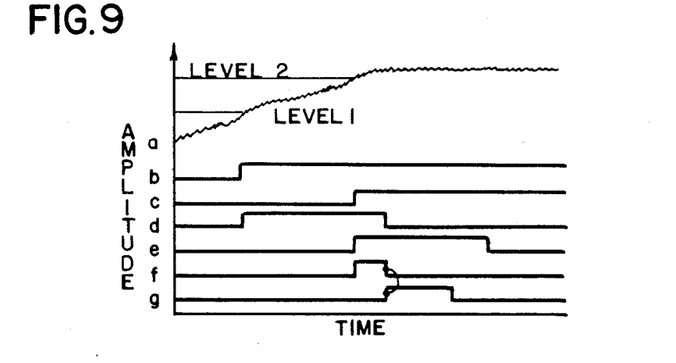
FIG. 9 is a representation of the signals generated in time at various points within the detector shown in FIG. 8 in accordance with this invention.

Operation of detector 46 may best be understood with reference to FIG. 9. FIG. 9 shows the relationship of signals "a" to "g" generated in detector 46 during operation.

Referring then to FIG. 9, and assuming electron beam 108 is sweeping pel row 106a, the output of transducer 200 shown at "a" ramps up to level 1 as the sweep enters field 112. With a transducer output in excess of reference signal 238 the output of comparator 238, shown at "b", goes up. As the output of comparator 234 rises, the pulse edge triggers multivibrator 242 whose output, shown at "d" also goes up. Since, however, only the output of multivibrator 242 is presented to gate 258 of driver 218, the output of gate 258 at "f" and accordingly driver 218, at "g" remains low. Thereafter, as the sweep continues along row 106a, the output of transducer 200 continues to ramp up until level 2 is exceeded as the sweep prepares to pass out of field 112. Accordingly, reference signal 250 is exceeded and the output of comparator 246 at "c" goes up. As the output of comparator 246 increases, multivibrator 254 is triggered, and its output at "e" goes up.

With the presence of the output of multivibrator 242 and 254, at the input to gate 258, the output of gate 258 at "f" goes up. Since the duration of multivibrator 242 is set to correspond to the transit time of the sweep through a diameter of field 112, as the sweep leaves field 112 the output of multivibrator 242 at "d" goes down.

On termination of the output from multivibrator 242, the output of gate 258 "f" goes down causing multivibrator 262 to be triggered. Since both reference conditions were satisfied during the prescribed period, the sweep is judged to have traversed a diameter of field 112. With the triggering of multivibrator 262, a signal at "g" is provided to the computer system indicating the sweep has just passed beneath conduit 46 and is exiting field of view 112. The system can thereafter correct for the time elapsed since the sweep actually passed beneath conduit 46 to provide the exact coordinates of the pen.

As is immediately apparent, by setting the second reference level to the maximum intensity expected for the sweep of a diameter, based on the geometry of field 112 no other row can satisfy the second reference level condition. As a result, no output is realized at gate 258 and no activation of multivibrator 262 can be effected for any sweep other than the one that traverses a diameter of field 112.

While this invention has been described in its preferred form, it will be appreciated by those skilled in the art that changes may be made in the form, construction, and arrangement of the elements without departing from its spirit or scope.

Having thus described our invention, what we claim as new, and desire to secure by Letters Patent is:

1. A light pen for use with an interactive display of a computer system, said display including a screen having a multiplicity of picture elements for visually presenting information provided by said computer system, said pen comprising:
    a body adapted to be hand held;
    a tip carried by said body and extending therefrom for engaging said screen;
    a principal fiber optic conduit mounted within said body and said tip for collecting light from said display when said tip has engaged said screen;
    screen sensor means in communication with said computer system, for determining whether said tip has engaged said screen and for supplying a signal indicative thereof to said computer system; and
    detector means in communication with said principal fiber optic conduit and said computer system, said detector means being responsive to first and second predetermined amplitudes of light collected by said principal conduit such that a signal is transmitted to said computer system by said detector means at the end of a fixed time interval following sensing by said detector means of light amplitude in excess of said first predetermined amplitude provided that during said fixed time interval said detector means also senses light amplitude in excess of said second predetermined amplitude,
    whereby, upon receipt of said detector means signal and said sensor means signal, said computer system may determine the position coordinates of said pen tip on said display screen.

2. The light pen of claim 1, wherein said detector means includes:
    a light transducer in communication with said principal fiber optic conduit for producing a signal representative of the light amplitude collected by said principal conduit;
    first threshold sensor means connected to said transducer for producing a signal when said transducer signal exceeds a predetermined first amplitude level;
    a second threshold sensor means connected to said transducer for producing a second signal when said transducer signal exceeds a predetermined second amplitude level;

driver means connected to said first and second threshold sensor means for providing a signal at the end of a fixed time interval following occurrence of said first signal provided said second signal occurs within said time interval.

3. The light pen of claim 2, wherein said transducer includes a photodiode connected to an amplifier.

4. The light pen of claim 3, wherein said first threshold sensor means includes a first level comparator having a first input connected to said amplifier, and a second input connected to a first reference signal of predetermined amplitude, said first level comparator producing a signal when the amplitude of the amplifier signal exceeds the amplitude of said first reference signal;

said first threshold sensor means further including a one shot multivibrator connected to said first level comparator, for producing a pulse of predetermined width upon receipt of said signal from said first level comparator;

said second threshold sensor means including a second level comparator, said second level comparator having a first input connected to the amplifier and a second input connected to a second reference signal of predetermined amplitude, said second level comparator producing a signal when the amplitude of the amplifier signal exceeds the amplitude of the second reference signal;

said second threshold sensor means also including a one shot multivibrator connected to said second level comparator, for producing a pulse of predetermined width upon receipt of the signal from the second level comparator, and wherein the amplitude of the second reference signal exceeds the amplitude of the first reference signal.

5. The light pen of claim 4, wherein the driver includes a gate having a first input connected to the multivibrator of the first threshold sensor means and a second input connected to the multivibrator of the second threshold sensor means for producing a signal when both the first and the second level multivibrator signals are present;

the driver further including a one shot multivibrator connected to the gate for producing a signal when the gate signal is turned off.

6. The light pen of claim 5, wherein the screen sensor means includes a light source, a fiber optic conduit and a detector, the sensor conduit enabling communication of the light source with the sensor detector, and wherein the sensor conduit includes a first segment and a second segment and means for optically coupling the first and second segments.

7. The light pen of claim 6, wherein the light pen body is of a generally cylindrical shape having the pen tip extending from one end thereof and movably mounted therein, and wherein the first and second segments of the sensor conduit are fixedly mounted within the pen body, a first end of the first segment being in communication with the light source and a first end of the second segment being in communication with the detector, a second end of the first segment and a second end of the second segment being arranged in proximity to one another.

8. The light pen of claim 7, wherein the means for optically coupling the first and second segments of the sensor conduit includes a reflective element located on a surface of the tip proximate the second end of the first segment and the second end of the second segment, the tip and the sensor conduit segments being arranged such that light communication from the light source over the first segment is coupled to the sensor detector over the second segment when the tip has not engaged the screen, thereby inhibiting the sensor from transmitting a signal to the computer system, and such that light from the light source is not coupled to the sensor detector when the tip has engaged the screen so that the sensor may transmit a signal indicative thereof to the computer system.

9. The light pen of claim 7, wherein the means for optically coupling the first and second segments of the sensor conduit includes an optical channel disposed in the tip, a first end of the channel being located proximate the second end of the first segment and a second end of the channel being located proximate the second end of the second segment, the tip and the sensor conduit segments being arranged such that the light communicated from the light source over the first segment is coupled to the sensor detector over the second segment when the tip has engaged the screen so that the sensor may transmit a signal indicative thereof to the computer system and such that light from the light source is not coupled to the sensor detector when the tip has not engaged the screen, inhibiting the sensor from transmitting a signal to the computer system.

10. The light pen of claim 9, wherein the tip includes a radially flexible member containing at least one end of the channel, the channel being disposed in the member such that at least one channel end is misaligned with and spaced from a companion segment of the sensor conduit when the tip is not in engagement with the screen, inhibiting the sensor from transmitting a signal to the computer system, the member further including a surface which cooperates with the body such that when the tip engages the screen, the member is caused to bring the at least one channel end contained therein into alignment with and adjacent the respective companion sensor conduit segment so that light from the light source may be coupled to the sensor detector and the sensor transmitting a signal indicative thereof to the computer system.

11. A light pen for use in an interactive display of a computer system, the display including a screen having a multiplicity of picture elements with a persistence less than the horizontal sweep time of the display for visually presenting information provided by the computer system, the pen comprising:

a body having a generally cylindrical shape which is adapted to be hand held;

a tip axially and movably mounted within an end of the body and extending therefrom for engaging the screen;

a principal fiber optic conduit axially mounted within the body and the tip for collecting light from a plurality of picture elements during a single display sweep when the tip has engaged the screen;

a screen sensor, in communication with the computer system, for determining if the tip has engaged the screen and for supplying a signal indicative thereof to the computer system, the sensor including a light source, a fiber optic conduit and a detector, the sensor fiber conduit including a first segment and a second segment and means for optically coupling the first and second segments;

a detector in communication with the principal fiber optic conduit and the computer system, the detector including a transducer in communication with the principal fiber optic conduit for producing a signal representative of the light intensity received from the principal conduit;

a first level sensor connected to the transducer for producing a signal when the transducer signal exceeds a predetermined first amplitude level; and a second level sensor connected to the transducer for producing a signal when the transducer signal exceeds a predetermined second amplitude level; and a driver connected to the first level sensor and the second level sensor for providing a signal in response to a combination of the first and second level sensor signals, whereby, on receipt of the driver signal and the screen sensor signal, the computer system may determine the position coordinates of the pen tip on the display screen.

12. The light pen of claim 11, wherein the first and second segments of the sensor conduit are fixedly mounted within the pen body, a first end of the first segment being in communication with the screen sensor light source and a first end of the second segment being in communication with the screen sensor detector, a second end of the first segment and a second end of the second segment being arranged in proximity to one another;

and wherein the means for coupling the sensor conduit segments includes an optical member associated with and moveable with the pen tip such that the optical path between the sensor light source and the sensor detector is made or interrupted depending upon whether the tip has engaged the screen or not.

13. The light pen of claim 12, wherein the transducer includes a photodiode connected to an amplifier, and wherein the first level sensor includes a comparator having a first input connected to the amplifier, and a second input connected to a first reference signal of predetermined amplitude, the first level comparator producing a signal when the amplitude of the amplifier signal exceeds the amplitude of the first reference signal, the first level sensor further including a one shot multivibrator connected to the first level comparator for producing a pulse of predetermined width on receipt of the signal from the first level comparator;

the second level sensor also including a comparator, the second level comparator having a first input connected to the amplifier and a second input connected to a second reference signal of predetermined amplitude greater than the amplitude of the first reference signal, the second level comparator producing a signal when the amplitude of the amplifier exceeds the amplitude of the second reference signal, the second level sensor also including a one shot multivibrator for producing a pulse of predetermined width on receipt of the signal from the second level comparator.

14. The light pen of claim 13, wherein the driver includes a gate having a first input connected to the multivibrator of the second level sensor for producing a signal when both the first and the second level multivibrator signals are present;

the driver further including a one shot multivibrator connected to the gate for producing a signal when the gate signal is turned off.

15. The light pen of claim 12, wherein the optical member of the means for coupling the first and second segments of the sensor conduit includes a reflective element located on a surface of the tip proximate the second end of the first conduit segment and the second end of the second conduit segment, the tip and the sensor conduit segments being arranged such that light communicated from the light source over the first segment is coupled to the sensor detector over the second segment when the tip has not engaged the screen, thereby inhibiting the sensor from transmitting a signal to the computer system, and such that light from the light source is not coupled to the sensor detector when the tip has engaged the screen so the sensor may transmit a signal indicative thereof to the computer system.

16. The light pen of claim 12, wherein the optical member of the means for coupling the first and second segments of the sensor conduit includes an optional channel disposed in the tip, the tip and the sensor conduit segments being arranged such that the light communicated from the light source over the first segment is coupled to the sensor detector over the second segment when the tip has engaged the screen so that the sensor may transmit a signal indicative thereof to the computer system and such that light from the light source is not coupled to the sensor detector when the tip has not engaged the screen inhibiting the sensor from transmitting a signal to the computer system.

17. The light pen of claim 16, wherein the tip includes a radially flexible member containing at least one end of the channel, the channel being disposed in the member such that at least one channel end is misaligned with and spaced from a companion segment of the sensor conduit when the tip is not in engagement with the screen, inhibiting the sensor from transmitting a signal to the computer system, the member further including a surface which cooperates with the body such that when the tip engages the screen, the member is caused to bring the channel end contained therein into alignment with and adjacent the respective sensor conduit segment so that light from the light source may be coupled to the sensor detector so the sensor may transmit a signal indicative thereof to the computer system.

18. A light pen arrangement for use in an interactive display of a computer system comprising:

a display having a screen phosphor, and an electron beam for scanning the phosphor;

a light pen with an optical field of view larger than a single scan line;

first threshold detection means for sensing when said scanning electron beam enters the field of view of said light pen;

second threshold detection means for sensing when said electron beam has scanned across the center region of the field of view of said light pen; and means for determining a fixed time interval following each low threshold detection, the position of said light pen being determined by the position of said scanning electron beam at the end of said fixed time interval when a high threshold detection has also been made during said time interval.

19. A light pen arrangement as defined in claim 18, including means in communication with said computer system for determining if the pen has engaged the screen and for supplying a signal indicative thereof to the computer system.

20. Apparatus as defined in claim 18, in which said detection means comprises:

means in communication with said light pen for producing an electrical signal representative of the light intensity received from said light pen as each of the horizontal lines in the field of view is scanned.

21. Apparatus as defined in claim 20, in which said detection means further comprises:
first comparator means for producing a first output signal when the electrical signal exceeds a predetermined first amplitude level;
second comparator means for producing a second output signal when the electrical signal exceeds a predetermined second amplitude level.

22. Apparatus as defined in claim 21 in which said detection means further comprises:
first pulse generator means responsive to said first comparator means for producing an output signal having a pulse width corresponding to said fixed time interval;
second pulse generator means responsive to said second comparator means for producing an output signal;
means responsive to said first and second pulse generator means for producing an output signal at the termination of said fixed time interval when an output signal from said second pulse generator means has also been present during said fixed time interval.

23. Apparatus as defined in claim 21 in which the second amplitude level is higher than said first amplitude level.

24. Light pen apparatus for use with an interactive display of a computer system, comprising:
a light pen for contacting the screen of an interactive display and for collecting light from said screen, said light pen having an optical field of view when in contact with said screen which is larger than a single scan line of said display;
means for sensing the amplitude of the light collected by said light pen;
first threshold detection means responsive to said sensing means for detecting when the amplitude of the light collected by said light pen exceeds a first threshold level;
second threshold detection means responsive to said sensing means for detecting when the amplitude of the light collected by said light pen exceeds a second threshold level;
means responsive to said second threshold detection means for determining the vertical position of said light pen with respect to said display screen; and
means responsive to said first threshold detection means for determining the horizontal position of said light pen with respect to said display screen.

25. Light pen apparatus as defined in claim 24 wherein said first threshold level corresponds with a collected light amplitude which changes rapidly so as to provide high resolution horizontal position determination therefrom.

26. Light pen apparatus as defined in claim 24 wherein said second threshold level corresponds with a collected light amplitude near the maximum collected by said light pen so that said second threshold detection means senses the scan line of said display which most closely corresponds with the center of the field of view of said pen.

27. Light pen apparatus as defined in claim 24 wherein horizontal position determination of said pen and vertical position determination of said pen are independent of each other.

* * * * *